US010952030B2

(12) United States Patent
Liu et al.

(10) Patent No.: US 10,952,030 B2
(45) Date of Patent: Mar. 16, 2021

(54) METHODS, DEVICES, SYSTEMS, AND COMPUTER-READABLE STORAGE MEDIUMS FOR LOCATION POSITIONING

(71) Applicant: Advanced New Technologies Co., Ltd., Grand Cayman (KY)

(72) Inventors: Jie Liu, Zhejiang (CN); Jiajia Li, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/713,405

(22) Filed: Dec. 13, 2019

(65) Prior Publication Data
US 2020/0120451 A1 Apr. 16, 2020

Related U.S. Application Data

(63) Continuation of application No. PCT/CN2018/091197, filed on Jun. 14, 2018.

(30) Foreign Application Priority Data

Jun. 19, 2017 (CN) .......................... 201710462361.1

(51) Int. Cl.
H04W 4/029 (2018.01)
H04W 4/80 (2018.01)
(Continued)

(52) U.S. Cl.
CPC ............. *H04W 4/029* (2018.02); *G01S 19/05* (2013.01); *H04W 4/40* (2018.02); *H04W 4/80* (2018.02); *H04W 76/11* (2018.02)

(58) Field of Classification Search
CPC ..... H04W 4/025; H04W 4/027; H04W 4/029; H04W 4/40; H04W 4/44; H04W 4/46;
(Continued)

(56) References Cited

U.S. PATENT DOCUMENTS 9,476,970 B1 * 10/2016 Fairfield .............. G05D 1/0268
2008/0065311 A1 * 3/2008 Bauchot ................ G08G 1/163
701/117
(Continued)

FOREIGN PATENT DOCUMENTS

CN 1881278 A 12/2006
CN 102768359 A 11/2012
(Continued)

OTHER PUBLICATIONS

International Search Report in the International Application No. PCT/CN2018/091197, dated Sep. 27, 2018.
(Continued)

*Primary Examiner* — Peter Chen
(74) *Attorney, Agent, or Firm* — Finnegan, Henderson, Farabow, Garrett & Dunner, LLP

(57) ABSTRACT

Location positioning methods, devices, systems, and computer-readable mediums are provided. One of the methods includes: receiving a vehicle identification and location information from at least one client terminal; and determining a location of a target vehicle corresponding to the vehicle identification according to the location information. The determining the location of the target vehicle corresponding to the vehicle identification according to the location information comprises: determining location information corresponding to the vehicle identification of the target vehicle received from the at least one client terminal within a set time period; determining a number of occurrences of each piece of the determined location information; and determining the location of the target vehicle corresponding to the vehicle identification according to a piece of the determined location information with a number of occurrences larger than a set threshold.

17 Claims, 6 Drawing Sheets

(51) Int. Cl.
*H04W 76/11* (2018.01)
*H04W 4/40* (2018.01)
*G01S 19/05* (2010.01)

(58) Field of Classification Search
CPC ....... H04W 4/80; H04W 76/11; H04W 76/14; H04W 76/40; G01S 19/05; G01S 19/46; G01S 5/02; G01C 21/26; G06K 7/0008
See application file for complete search history.

(56) References Cited

U.S. PATENT DOCUMENTS

| | | | | |
|---|---|---|---|---|
| 2014/0279587 | A1* | 9/2014 | Gafford | G06Q 50/18 |
| | | | | 705/311 |
| 2015/0279125 | A1* | 10/2015 | Chronowski | H04L 67/12 |
| | | | | 701/29.2 |
| 2016/0325634 | A1* | 11/2016 | Foldesi | H02J 7/00047 |

FOREIGN PATENT DOCUMENTS

| | | |
|---|---|---|
| CN | 104569911 A | 4/2015 |
| CN | 105282703 A | 1/2016 |
| CN | 106101269 A | 11/2016 |
| CN | 106550330 A | 3/2017 |
| CN | 106716068 A | 5/2017 |
| CN | 106842125 A | 6/2017 |
| CN | 107295071 A | 10/2017 |
| WO | WO 2016/181763 A | 11/2016 |

OTHER PUBLICATIONS

Written Opinion of Application No. 11201911007W, from the Intellectual Property Office of Singapore, dated Nov. 10, 2020.

* cited by examiner

200

201

Receiving a vehicle identification and location information sent by at least one client terminal

202

Determining a location of the vehicle corresponding to the vehicle identification according to the location information

FIG. 2

METHODS, DEVICES, SYSTEMS, AND COMPUTER-READABLE STORAGE MEDIUMS FOR LOCATION POSITIONING

CROSS-REFERENCE TO RELATED APPLICATION

This application is a continuation application of International Application No. PCT/CN2018/091197, filed on Jun. 14, 2018, which is based upon and claims priority to Chinese Application No. 201710462361.1, filed on Jun. 19, 2017, both of which are incorporated herein by reference in their entireties.

TECHNICAL FIELD

The present disclosure generally relates to the field of computer technologies, and in particular, to methods, devices, systems, and computer-readable mediums for location positioning.

BACKGROUND

As a means of transportation, vehicles provide convenience for the public. To effectively use and manage a vehicle, it may be necessary to accurately determine the location of a vehicle. At present, existing position techniques include determining a location based on the Global Positioning System (GPS). Specifically, a GPS module can be installed on the vehicle in advance, and when the vehicle is traveling, a current location of the vehicle can be obtained from the global satellite positioning system through signal interaction between the GPS module and the global satellite positioning system. The GPS module reports the obtained location to a vehicle management server, so that the vehicle management server can obtain the driving location of the vehicle in time.

However, since GPS signals transmitted between the GPS module and the global satellite positioning system can be greatly affected by the environment, especially in large cities with high-rise buildings and overpasses. The strength of GPS signals may not meet the actual needs. The vehicle may not be able to obtain GPS signals containing location information in time, which reduces the accuracy of vehicle location positioning.

SUMMARY

In view of this, embodiments of the specification provide methods, devices, systems, and computer-readable storage mediums for location positioning. One advantage of the embodiments provided herein is to address the problem of inaccurate location positioning of a vehicle.

In one aspect, a method for location positioning includes: receiving a vehicle identification and location information from at least one client terminal; and determining a location of a target vehicle corresponding to the vehicle identification according to the location information. The determining the location of the target vehicle corresponding to the vehicle identification according to the location information comprises: determining location information corresponding to the vehicle identification of the target vehicle received from the at least one client terminal within a set time period; determining a number of occurrences of each piece of the determined location information; and determining the location of the target vehicle corresponding to the vehicle identification according to a piece of the determined location information with a number of occurrences larger than a set threshold.

In another aspect, a device for location positioning includes a processor, and a memory storing instructions executable by the processor; wherein the processor is configured to: receive a vehicle identification and location information from at least one client terminal; and determine a location of a target vehicle corresponding to the vehicle identification according to the location information. In determining the location of the target vehicle corresponding to the vehicle identification according to the location information, the processor is further configured to: determine location information corresponding to the vehicle identification of the target vehicle received from the at least one client terminal within a set time period; determine a number of occurrences of each piece of the determined location information; and determine the location of the target vehicle corresponding to the vehicle identification according to a piece of the determined location information with a number of occurrences larger than a set threshold.

In still another aspect, a non-transitory computer readable medium stores instructions that, when executed by a processor of a device, cause the device to perform a method for location positioning, the method comprising: receiving a vehicle identification and location information from at least one client terminal; and determining a location of a target vehicle corresponding to the vehicle identification according to the location information. The determining the location of the target vehicle corresponding to the vehicle identification according to the location information comprises: determining location information corresponding to the vehicle identification of the target vehicle received from the at least one client terminal within a set time period; determining a number of occurrences of each piece of the determined location information; and determining the location of the target vehicle corresponding to the vehicle identification according to a piece of the determined location information with a number of occurrences larger than a set threshold.

The technical solutions adopted by the embodiments of the specification can provide at least the following advantages. In some embodiments, the client terminal acquires the vehicle identification of the target vehicle, determines the location information when the vehicle identification is acquired, and then sends the vehicle identification and the location information to the server. The server determines the location of the target vehicle based on the location information.

Compared with the existing techniques for determining the location of the vehicle through GPS, the client terminal disclosed herein can be used to determine the location of the vehicle. That way, the positioning system is not affected by reduced GPS signal strength due to environmental factors, which affects GPS-based positioning. Even in big cities with high-rise buildings and overpasses, by determining the location information when the vehicle identification is acquired through different client terminals, the success rate and effectiveness of the location information acquisition can be improved. The continuity and accuracy of the location positioning of the target vehicle can therefore be ensured.

BRIEF DESCRIPTION OF THE DRAWINGS

The accompanying drawings described herein are constitute a part of the specification. The illustrative embodiments and the description thereof are used to explain the present disclosure and are not intended to constitute any improper limitation to the present disclosure.

FIG. 2 is a flowchart of a method for location positioning according to an embodiment.

DETAILED DESCRIPTION

Embodiments of the specification provide location positioning methods, devices, systems, and computer-readable mediums. According to some embodiments, a client terminal acquires a vehicle identification of a target vehicle, determines location information when acquiring the vehicle identification, and then sends the vehicle identification and the location information to a server. The server can determine the location of the target vehicle according to the location information.

It should be noted that the vehicles described in the embodiments of the specification may be public transportation vehicles, such as buses, taxis, public bicycles, shared bicycles. The vehicles can also be vehicles or transportation mediums other than public transportation vehicles, such as private cars, or shared-ride vehicles.

The client terminal described in the embodiments of the specification may be a smart terminal device, such as a smart phone, a tablet, a laptop computer, or a smart watch. The client terminal can also be a vehicle management device, such as a monitoring device deployed at a traffic intersection.

Technical solutions of the present disclosure will be described in detail in the following with reference to exemplary embodiments and the corresponding accompanying drawings. It is appreciated that the described embodiments are only a part of the embodiments of the present disclosure, and not all of them. All other embodiments obtained by a person of ordinary skill in the art based on the embodiments of the present disclosure belong to the protective scope of the present disclosure.

Figure 1:
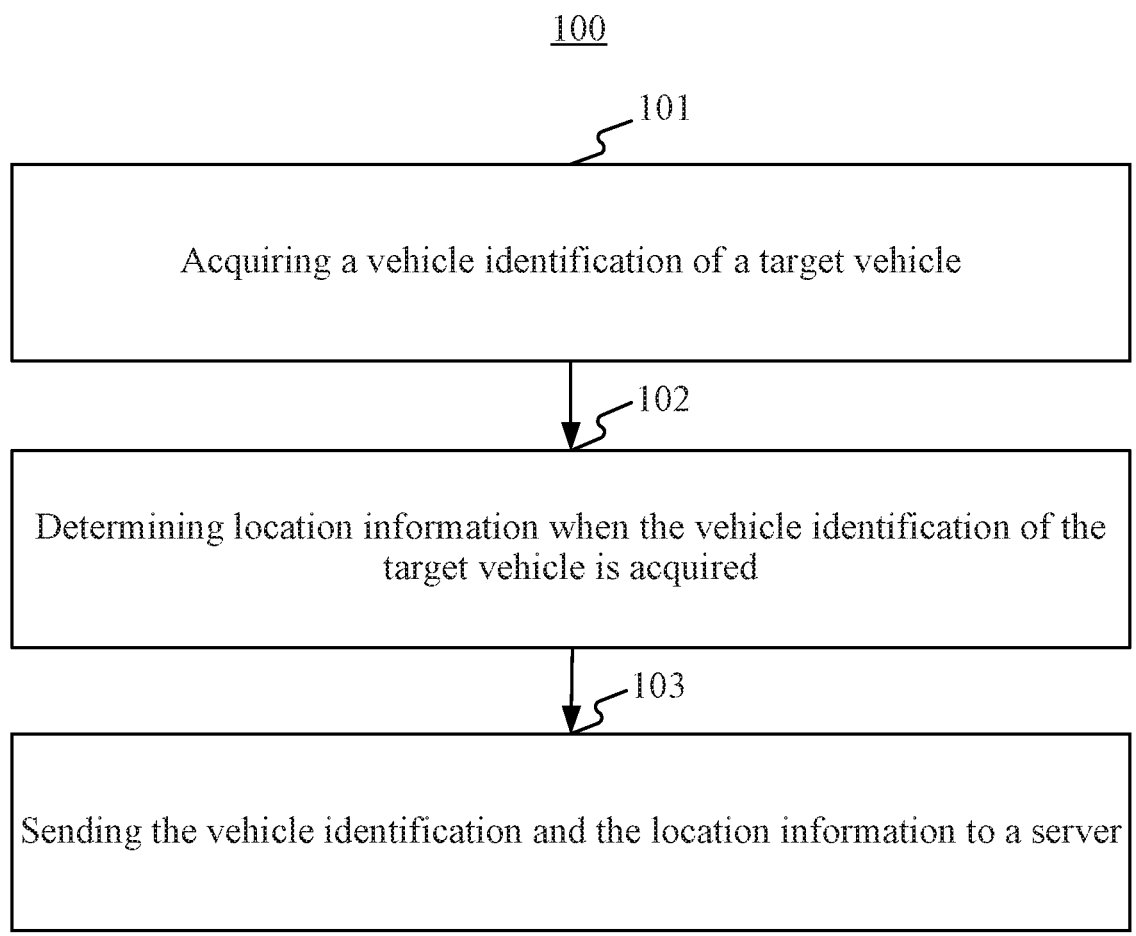
FIG. 1 is a flowchart of a method for location positioning according to an embodiment.

FIG. 1 is a flowchart of a method 100 for location positioning, according to an embodiment. The method 100 can be performed by a client terminal. That is, a client terminal that can implement the technical solutions described in the following embodiments. For example, the method 100 can be executed in a smart terminal device in a form of an application (APP). As shown in FIG. 1, the method 100 may include the following steps.

In step 101, a vehicle identification of a target vehicle is acquired.

The target vehicle described in the embodiments of the specification may be any type of vehicles. The vehicle identification described in the embodiments of the specification can uniquely identify or characterize the vehicle. The vehicle identification may be a model of the vehicle, an engine number of the vehicle, a license plate number of the vehicle, and the like. In the application scenario where the target vehicle is a public transportation vehicle, the vehicle identification may further include vehicle/route number information of the public transportation vehicle.

In some practical applications, users who can acquire the vehicle identification of the target vehicle using client terminals may be roughly classified into three types. The first type is a driver of the target vehicle. The second type is a passenger riding the target vehicle. The third type is other persons located near the target vehicle. All of the three types of users can acquire the vehicle identification of the target vehicle. The methods used to acquire the vehicle identification of the target vehicle may be the same or different, as further described below.

In some embodiments, when driving the target vehicle, the driver of the target vehicle may use, for example, the following approaches to enable the client terminal to acquire the vehicle identification of the target vehicle.

The client terminal receives the vehicle identification input by the driver. In this case, it can be considered that the client terminal has acquired the vehicle identification of the target vehicle.

Assuming that the target vehicle is a public transportation vehicle, and the client terminal can be applied with respect to a public transportation vehicle management system. After the public transportation vehicle management system allocates the vehicle to the driver, the vehicle identification of the allocated vehicle (the target vehicle described in the embodiments) may be sent to the client terminal associated with the driver. At this time, the client terminal can also acquire the vehicle identification of the target vehicle.

In some embodiments, a carrier or medium carrying the vehicle identification can be arranged in the target vehicle. For example, if a carrier carrying the vehicle identification of the target vehicle is detected, the vehicle identification of the target vehicle can be obtained from the carrier.

In the embodiments, the carrier carrying the vehicle identification of the target vehicle may be a Radio Frequency Identification (RFID) tag. The carrier may also be an in-vehicle fee-charging terminal storing the vehicle identification of the vehicle, or a two-dimensional code image storing the vehicle identification. The carrier can be implemented in other forms, which is not limited herein. The following describes exemplary types of carriers that can be used with the embodiments.

If the carrier carrying the vehicle identification of the target vehicle is an RFID tag, when the RFID tag is detected, the vehicle identification of the target vehicle can be obtained from the RFID tag.

For example, when a distance between the client terminal and the RFID tag carrying the vehicle identification of the target vehicle is less than or equal to a propagation distance of a RF signal transmitted by the RFID tag, the client terminal can receive the RF signal sent by the RFID tag. In that case, it can be considered that the client terminal has detected the RFID tag. The client terminal can parse the vehicle identification of the target vehicle from the received RF signal.

It is appreciated that the RFID tag can be any type of non-contact automatic identification tag capable of transmitting a vehicle identification through a radio frequency signal. The RFID tags may be an electronic tag or a smart tag, which can store the vehicle identification of the vehicle into a storage space using electronic technologies. Depending on whether power is carried by the tags. RFID tags can be classified into different categories, such as passive type RFID tags (i.e., passive RFID tags) and active type RFID tags (i.e., active RFID tags).

Taking a passive RFID tag as an example, the client terminal can broadcast a request message for requesting the vehicle identification. Since the passive RFID tag includes a radio wave transceiver, the passive RFID tag can receive the request message broadcast by the client terminal through the radio wave transceiver. The passive RFID tag can send the stored vehicle identification to the client terminal in the form of a radio frequency signal. That way, the client terminal can obtain the vehicle identification of the vehicle from the passive RFID tag.

Taking an active RFID tag as an example, the active RFID tag has the feature of actively transmitting a radio frequency signal. That is, the active RFID tag can transmit radio frequency signals by broadcasting. When a distance between the client terminal and the active RFID tag is less than or equal to a propagation distance of the radio frequency signal, the client terminal can receive the radio frequency signal broadcasted by the active RFID tag. The client terminal can then parse the vehicle identification of the vehicle from the radio frequency signal.

In an embodiment, the RFID tag can be provided on the vehicle. The client terminal can obtain the vehicle identification of the vehicle from the RFID tag as long as the distance between the client terminal and the RFID tag satisfies a requirement with respect to the propagation distance of the radio frequency signal transmitted by the RFID tag. For example, the distance between the client terminal and the RFID tag needs to be within the propagation distance of the signal.

In an embodiment, if the carrier carrying the vehicle identification is an RFID tag, the client terminal can dynamically acquire the vehicle identification of the vehicle. This helps achieve automatic acquisition and real-time acquisition of the vehicle identification, thereby facilitating subsequent location positioning of the vehicle.

It is appreciated that the above described carrier-approach can be used by the driver of the target vehicle, the passenger riding the target vehicle, and other persons located in the vicinity of the target vehicle. Acquisition manners of the vehicle identification of the target vehicle can be flexible.

In an embodiment, the client terminal can perform signal interaction with the RFID tag in a periodic manner (e.g., at fixed intervals) or at fixed times, in addition to performing signal interaction with the RFID tag in real time, to acquire the vehicle identification from the RFID tag.

As an example, the client terminal can perform signal interaction with the RFID tag periodically or at fixed times. Starting from the driver boarding the vehicle, once it is determined that the client terminal is in an operation state, the client terminal used by, for example, the driver of the vehicle, can acquire the vehicle identification of the vehicle from the RFID tag of the vehicle by the above described approach, such as at fixed time intervals. As another example, a passenger riding the vehicle can also periodically obtain the vehicle identification of the vehicle from the RFID tag of the vehicle during the ride.

Whether it is periodic acquisition, fixed-time acquisition, or real-time acquisition may be determined according to actual needs, or may be determined by the user (for example, a driver, a passenger riding the vehicle, etc.). The specific manner of implementation is not limited here.

Since the radio frequency signal transmitted by the RFID tag has a certain signal strength, any user who appears within the coverage of the transmitted signal can receive the radio frequency signal. That is, they can all obtain the vehicle identification of the vehicle from the RFID tag of the vehicle. Thus, if the carrier is an RFID tag, the approach for obtaining the vehicle identification of the vehicle is relatively flexible, and the technical solutions described above can be widely used.

In an embodiment, the carrier carrying the vehicle identification of the target vehicle can be an in-vehicle fee-charging terminal. The vehicle identification of the target vehicle can be obtained from the in-vehicle fee-charging terminal, for example, when a boarding request is sent to the in-vehicle fee-charging terminal.

For example, if the target vehicle is a public transportation vehicle, the location of the vehicle may need to be determined in a timely manner so as to assess the distribution and operation of public transportation vehicles. The location of the vehicle may be determined according to the technical solutions described above. In order to improve the accuracy of the vehicle location positioning, the vehicle identification may be stored in the in-vehicle fee-charging terminal. That way, when a user sends a boarding request to the in-vehicle fee-charging terminal at the time of boarding the vehicle, the vehicle identification can be obtained from the in-vehicle fee-charging terminal in a near field communication (NFC) mode.

It is appreciated that the boarding request here can be understood as being sent by the user to the in-vehicle fee-charging terminal when boarding the vehicle. The in-vehicle fee-charging terminal can determine the station or location where the user gets on the vehicle. This information may also be used for subsequent calculation of the fare.

In an embodiment, the carrier can be a WIFI device associated with the target vehicle. The vehicle identification of the target vehicle can be obtained from the WIFI device when the WIFI device is accessed.

With the development of mobile internet technologies, installing WIFI devices on vehicles is becoming more and more popular. With the WIFI device, mobile Internet services can be provided to a user riding the vehicle. In the embodiment, the vehicle identification of the vehicle may be stored in the WIFI device. When a client terminal used by the user accesses the WIFI device provided on the vehicle, the vehicle identification of the target vehicle can be obtained from the WIFI device.

For example, a WIFI identification of the WIFI device can uniquely represent the WIFI device. When the WIFI device is installed on a vehicle, the server may store a mapping relationship between the WIFI identification of the WIFI device and the vehicle identification of the vehicle. The client terminal can take the WIFI identification of the WIFI device as the vehicle identification of the target vehicle. When the client terminal sends the WIFI identification to the server, the server can determine the vehicle identification of the vehicle according to the mapping relationship. It is appreciated that as long as the client terminal can detect the WIFI identification of the WIFI device, the vehicle identification of the vehicle can be obtained based on the WIFI identification of the WIFI device.

The approaches for acquiring the vehicle identification of the target vehicle in step 101 may be implemented by one of the above described approaches, or may be implemented by a combination of any of the above described approaches, which is not limited herein.

Still referring to FIG. 1, in step 102, location information when the vehicle identification of the target vehicle is acquired is determined.

In some embodiments, in order to accurately determine the location of the vehicle, the client terminal can determine or acquire the location when acquiring the vehicle identification of the target vehicle. Through locations acquired by different client terminals, the server can subsequently determine the location of the vehicle based on the locations provided by the client terminals.

In some embodiments, the approaches for the client terminals to determine the location include, but are not limited to, an Assisted Global Positioning System (A-GPS) positioning technology, a base station positioning technology, a Location Based Service (LBS) technology, and the like.

Taking A-GPS as an example, compared with traditional GPS signals, A-GPS utilizes base stations deployed by a communications operator, supplemented by positioning assistance provided by a secondary server in communication with GPS receivers in smart phones, to complete ranging and positioning services. Therefore, A-GPS is relatively less dependent on the environment and can overcome the problems in traditional GPS positioning.

For example, in large cities with high-rise buildings and overpasses, A-GPS uses mobile communication networks for positioning, which can address the coverage problem of traditional GPS. The signal strength and transmission quality of mobile communication network signals are also less affected by the environment than the GPS satellite signals. Location positioning using the client terminal can be more effective. In addition, since the A-GPS has assisted positioning from the mobile communication operation base stations, the accuracy of client terminal location positioning is improved. Using A-GPS can therefore improve the accuracy in determining the location of the vehicle.

In some embodiments, the location information determined by the client terminal can be used as the basis for the server to determine the location of the target vehicle. By determining the location information using the client terminal, on one hand, the need to modify the vehicle by additionally installing a GPS module can be eliminated, and the production cost can be lowered. On the other hand, the positioning function of the client terminals can be efficiently used and the efficiency of location positioning is improved.

For example, as described above, the client terminal can acquire the vehicle identification of the target vehicle by detecting the RFID tag. The client terminal can activate a location positioning function when detecting the RFID tag. The location information obtained by the positioning function can be determined as the location information when the vehicle identification of the target vehicle is acquired. A mapping relationship can be established between the vehicle identification and the location information. Further, the vehicle identification and location information can be stored according to the mapping relationship.

In some embodiments, the client terminal can obtain the vehicle identification from the RFID tag periodically or at fixed time intervals. Assuming that the client terminal obtains the vehicle identification from the RFID tag in a periodic manner, step 102 can be performed in real time or in a periodic manner to determine or acquire the location information. The time interval can be the same as that for acquiring the vehicle identification of the vehicle.

If the client terminal obtains the vehicle identification from the RFID tag in a periodic manner according to a preset time interval, when the vehicle identification is obtained at an adjacent later time, it can be further determined whether the vehicle identification obtained at the adjacent earlier time and the vehicle identification obtained at the adjacent later time are identical. If the vehicle identifications obtained at two adjacent times are identical, at least one piece of the location information acquired during the two adjacent times can be determined as the location information when the vehicle identification is acquired. In that way, the client terminal can obtain a mapping relationship between one vehicle identification and at least one piece of location information during one time interval.

It should be appreciated that, if the carrier of the vehicle identification is an RFID tag, and if there are a plurality of vehicle identifications acquired by a client terminal, the client terminal may establish a mapping relationship between the plurality of vehicle identifications and at least one piece of location information. Here, the location information corresponding to different vehicle identifications may be the same or different, which is not limited herein.

If the carrier carrying the vehicle identification is an in-vehicle fee-charging terminal (or the WIFI device), after the boarding request is sent to the in-vehicle fee-charging terminal (or the WIFI device is accessed), the location information can be determined periodically or in real time. At least one piece of location information can be determined as the location information when the vehicle identification of the target vehicle is acquired.

After the boarding request is sent to the in-vehicle fee-charging terminal (or the WIFI device is accessed), the user of the client terminal should be on the vehicle until a deboarding request is sent to the in-vehicle fee-charging terminal (or the coupling to the WIFI device is disconnected). The client terminal does not need to perform the vehicle identification acquisition operation at this time. The client terminal can determine the location information periodically or in real time. That way, the client terminal can acquire at least one piece of location information, in which case the at least one piece of location information may be determined as the location information when the vehicle identification of the target vehicle is acquired.

It is appreciated that determining the location information in step 102 may be performed at the same time as acquiring the vehicle identification in step 101. Step 102 may also be performed after acquiring the vehicle identification in step 101. The order of the procedures are not limited herein. As described above, in step 102, the determined location information is the location information when the vehicle identification is acquired. This can be understood as that the time of acquiring the vehicle identification is approximately the same as the time of obtaining the location information. Alternatively, it can also be understood as that there is a deviation between the time of acquiring the vehicle identification and the time of obtaining the location information, and the deviation can be within a set range.

Still referring to FIG. 1, in step 103, the vehicle identification and the location information are sent to the server, such that the server can determine a location of the target vehicle according to the location information.

In some embodiments, after acquiring the vehicle identification and the location information obtained from positioning, the client terminal may immediately send the vehicle identification and the location information to the server. In some embodiments, the client terminal may also send the vehicle identification and at least one piece of the location information corresponding to the vehicle identification to the server at a set sending time.

In some embodiments, after determining the location information when the vehicle identification of the target vehicle is acquired, the client terminal stores the location information corresponding to the vehicle identification and the vehicle identification.

In some embodiments, since the client terminal may acquire more than one vehicle identification, the client terminal may send the vehicle identifications and the location information in a form of (vehicle identifications, location information) to the server. For example, if the client terminal acquires two vehicle identifications at the same time, the information sent by the client terminal to the server is (vehicle identification 1, vehicle identification 2; location information).

Furthermore, when the set sending time arrives, the client terminal may acquire a plurality of vehicle identifications during the two adjacent sending times, and may also have a plurality of pieces of location information obtained from positioning. For example, the client terminal can send information in the form of (vehicle identification 1; location information 1, location information 2, . . . , location information n) and (vehicle identification 2; location information 1) to the server. That is, during the two adjacent sending times, the vehicle corresponding to the identification 1 passes through the locations corresponding to the location information 1 through the location information n. During the two adjacent sending times, the vehicle corresponding to the identification 2 passes through the location corresponding to the location information 1.

Through the technical solutions provided by the embodiments of the specification, the client terminal acquires the vehicle identification of the target vehicle, determines the location information when the vehicle identification is acquired, and then sends the vehicle identification and the location information to the server. The server can determine the location of the target vehicle based on the location information. As noted above, one problem with using the traditional GPS technique is that, the GPS signal strength can be weakened due to environmental factors. In that case, the vehicle location may not be positioned efficiently and accurately. Compared with the existing techniques for determining the location of the vehicle through GPS, the technical solutions provided by the embodiments of the specification can avoid the problem caused by weak GPS signals. Even in big cities with high-rise buildings and overpasses, by determining the location information when the vehicle identification is acquired using different client terminals, the success rate and effectiveness of the location information acquisition can be improved. The continuity and accuracy of the location positioning of the target vehicle can thereby be ensured.

FIG. 2 is a flowchart of a method 200 for location positioning according to an embodiment. The method 200 can be performed by, for example, a server. As shown in FIG. 2, the method 200 may include the following steps.

In step 201, a vehicle identification and location information sent by at least one client terminal are received. In some embodiments, the client terminal may send the acquired vehicle identification and the location information obtained from positioning to the server according to the approaches described above, which will not be repeated herein.

In step 202, a location of the vehicle corresponding to the vehicle identification is determined according to the location information.

In some embodiments, the client terminal may send the acquired vehicle identification and the location information obtained from positioning to the server in real time. When receiving the vehicle identification and location information sent by the client terminal, the server can determine the target vehicle according to the vehicle identification. The received location information can be grouped according to the vehicle identifications. The location information corresponding to the same vehicle identification can be included into the same location information group. The location information in the same location information group can be processed to determine the location of the vehicle corresponding to the vehicle identification.

In some practical applications, the server may determine a time period for determining the location of the vehicle. For example, for the target vehicle, location information corresponding to the vehicle identification of the target vehicle sent by the client terminal and received within the set time period can be determined. The received location information can be processed. According to the processing result, a location of the target vehicle corresponding to the vehicle identification can be determined.

There may be a difference between the location of the client terminal and the actual location of the vehicle, and the location information of the same vehicle sent by different client terminals at the same time may also be different. In some embodiments, an offset weight of each piece of location information received may be determined. A processing result may be calculated based on the offset weights of the pieces of location information and the coordinates contained in the pieces of location information.

It should be appreciated that the offset weights described in the embodiments can be used to represent the extent to which the location information deviates from the actual location of the target vehicle. A traveling location of the vehicle may be predicted based on the road on which the vehicle is currently traveling. A difference between the received location information and the predicted location can be determined. The offset weight can be determined according to the value or amount of the difference. In addition, in some embodiments, different approaches may be used for determining the above-described offset weight, which is not limited herein.

For example, if the target vehicle is a public transportation vehicle, it can be determined whether the road corresponding to the location information sent by the client terminal is a main road. If so, it can indicate that it is of greater possibility that the client terminal is on the vehicle, and there is a small offset between the location information and the actual location of the vehicle. Accordingly, an offset weight value determined for the location information can be large. Alternatively and/or additionally, it can be determined whether a distance from the location information to a nearby main road is within an acceptable range. If so, it can indicate that the client terminal is within a short range to the vehicle, and an offset between the location information and the actual location of the vehicle is relatively small. Accordingly, an offset weight value determined for the location information can be large. The above-described determining method can be applicable to the situation where a user of the client terminal is a pedestrian in the vicinity of the vehicle.

In some embodiments, it can be determined whether the road corresponding to the location information is a road dedicated to public transportation vehicles. If so, it can indicate that it is of greater possibility that the client terminal is on the vehicle, and there is a small offset between the location information and the actual location of the vehicle. Accordingly, an offset weight value determined for the location information is large.

In some embodiments, a number of pieces of location information for the same vehicle identification which are sent by the client terminals to the server within a set time period can be larger than 1. Before determining the location of the target vehicle corresponding to the vehicle identification according to the location information, the method can further include the following operations.

When a number of pieces of location information corresponding to the vehicle identification of the target vehicle which are sent by each client terminal and received within the set time period is larger than 1, the following operations can be performed on the location information corresponding to the vehicle identification of the target vehicle sent by each client terminal: determining a generation time of each piece of location information corresponding to the vehicle identification of the target vehicle sent by the client terminal; according to the generation time, selecting, from the pieces of location information, location information satisfying a set condition; and determining the selected location information as the location information corresponding to the vehicle identification of the target vehicle sent by the client terminal within the set time period.

Assuming that at a time T, the server receives a vehicle identification and location information corresponding to the vehicle identification sent by 3 client terminals, for example, (vehicle identification 1; location information 1) sent by a client terminal 1; (vehicle identification 1; location information 2, location information 3, location information 4) sent by a client terminal 2; and (vehicle identification 1; location information 5) sent by a client terminal 3.

Since there is more than one piece of location information sent by the client terminal 2, to determine the location of the vehicle, the generation times associated with the location information 2, the location information 3, and the location information 4 sent by the client terminal 2 can be determined. A piece of location information with a generation time most recent to the current processing time of the server can be determined as the location information corresponding to the vehicle identification 1 sent by the client terminal 2. Assuming that the location information 4 is the location information satisfying the set condition, the server may determine the location of the vehicle corresponding to the vehicle identification 1 based on the location information 1, the location information 4, and the location information 5. It should be appreciated that the set conditions here can be determined according to actual needs, which is not limited here.

The generation time described in the embodiments can be understood as the time when the client terminal obtains the location information from positioning. When the number of pieces of location information corresponding to the vehicle identification sent by the client terminal to the server is one, the generation time of the location information may not be sent. When the number of pieces of location information corresponding to the vehicle identification sent by the client terminal to the server is more than one, the generation times of the pieces of location information can also be sent to the server along with the vehicle identification and the location information, so that the server can accurately determine the location of the vehicle.

In some embodiments, determining the location of the vehicle corresponding to the vehicle identification according to the location information can include: determining, for the target vehicle, location information corresponding to the vehicle identification of the target vehicle sent by different client terminals and received within the set time period; counting a number of occurrences of each piece of the location information; and determining the location of the vehicle corresponding to the vehicle identification according to the location information of which the number of occurrences is larger than a set threshold.

If the number of pieces of location information having a number of occurrences larger than the set threshold is more than 1, the location information may be determined by the above-described clustering method. The location corresponding to the location information can be determined as the location of the vehicle.

In some embodiments, determining the location of the vehicle corresponding to the vehicle identification according to the location information includes: determining, for the target vehicle, a generation time of each piece of location information corresponding to the received vehicle identification; processing location information with the same generation time to obtain a location of the target vehicle at a time corresponding to the generation time; and when a location of the target vehicle corresponding to each generation time is obtained, determining a moving track of the target vehicle based on each of the locations.

As an example, table 1 is a list including location information received by the server for the vehicle identification 1.

TABLE 1

| Client Terminal Identification | Generation Time T1 | Generation Time T2 | Generation Time T3 | Generation Time T4 | Generation Time T5 |
|---|---|---|---|---|---|
| 001 | Location Information 1 | Location Information 2 | Location Information 3 | Location Information 4 | Location Information 5 |
| 010 | | Location Information 9 | | Location Information 7 | |
| 100 | Location Information 8 | | Location Information 6 | | Location Information 10 |
| 101 | | Location Information 11 | | Location Information 14 | |

According to the above-described manner, the location of the vehicle corresponding to the time T1 can be determined based on a processing result 1 (of the location information 1 and the location information 8). The location of the vehicle corresponding to the time T2 can be determined based on a processing result 2 (of the location information 2, the location information 9 and the location information 11). The location of the vehicle corresponding to the time T3 can be determined based on a processing result 3 (of the location information 3 and the location information 6). The location of the vehicle corresponding to the time T4 can be determined based on a processing result 4 (of the location information 4, the location information 7 and the location information 14). The location of the vehicle corresponding to the time T5 can be determined based on a processing result 5 (of the location information 5 and the location information 10). For example, the processing can be based on the offset weight value assignment method as described above.

Further, according to the processing result 1, the processing result 2, the processing result 3, the processing result 4, and the processing result 5, the traveling route of the vehicle corresponding to the vehicle identification 1 can be determined. It should be appreciated that the technical solutions described in the embodiments of the specification can be applied to public transportation systems such as buses and public bicycles. Drivers, passengers, and pedestrians in the vicinity of the vehicle can be users of the client terminals, which acquire a vehicle identification and position location information, and report the vehicle identification and the location information to the server. Thereby, a user who uses public transportation can obtain the real-time location of the desired target vehicle from the server.

Moreover, with the technical solutions of the present disclosure, the location information when the vehicle identification is acquired can be determined by means of a client terminal. Therefore, there is no need to modify the vehicle to install a GPS module as in the conventional positioning method. There is no damage to the vehicle, causing no change to the vehicle layout and thereby reducing the manufacturing cost. In addition, a carrier carrying the vehicle identification on the vehicle can be installed on the surface of the vehicle body or in the passenger compartment, without modification to the original internal structure of the vehicle, thus lowering the cost.

Figure 3:
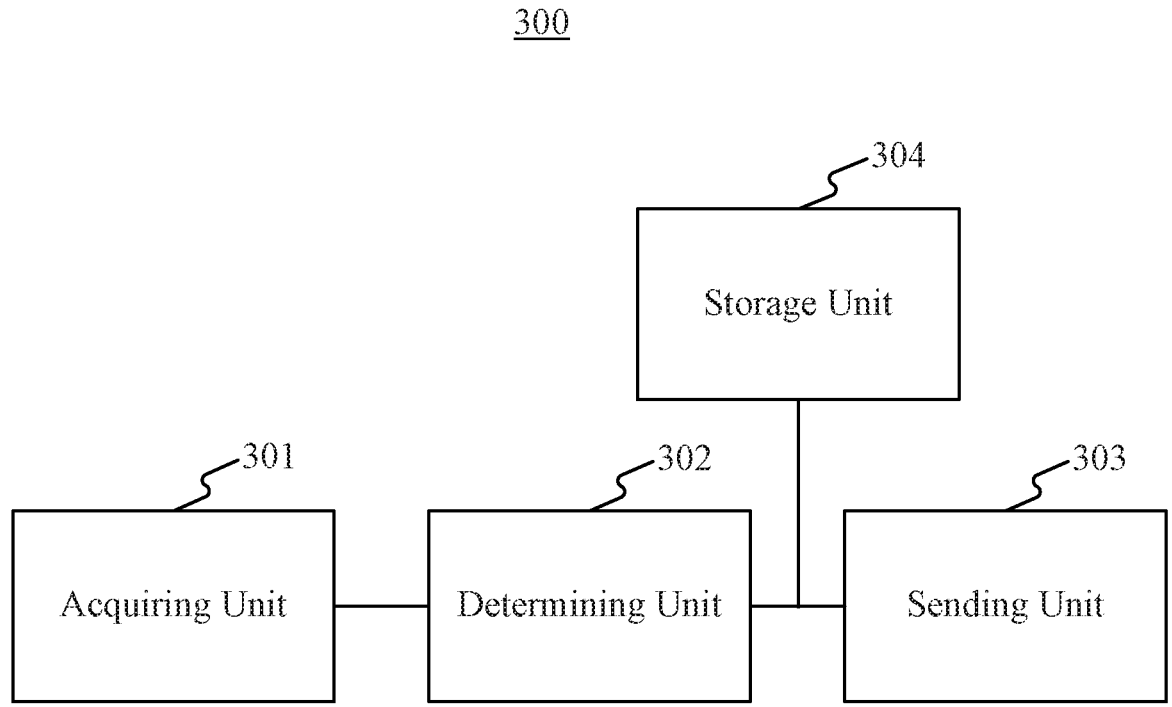
FIG. 3 is a block diagram of a device for location positioning according to an embodiment.

FIG. 3 is a block diagram of a device 300 for location positioning according to an embodiment. For example, the device 300 may be a client terminal. As shown in FIG. 3, device 300 includes an acquiring unit 301, a determining unit 302 and a sending unit 303.

The acquiring unit 301 can acquire vehicle identification of a target vehicle.

The determining unit 302 can determine location information when the vehicle identification of the target vehicle is acquired.

The sending unit 303 can send the vehicle identification and the location information to a server, such that the server determines a location of the target vehicle according to the location information.

In some embodiments, the acquiring unit 301 acquiring a vehicle identification of a target vehicle can include: if a carrier carrying the vehicle identification of the target vehicle is detected, obtaining the vehicle identification of the target vehicle from the carrier.

In some embodiments, the acquiring unit 301 obtaining the vehicle identification of the target vehicle from the carrier can include: when the carrier is a radio frequency identification RFID tag, and when the RFID tag is detected, obtaining the vehicle identification of the target vehicle from the RFID tag.

In some embodiments, the acquiring unit 301 obtaining the vehicle identification of the target vehicle from the RFID tag can include: obtaining the vehicle identification from the RFID tag in a periodic manner.

In some embodiments, the determining unit 302 determining location information when the vehicle identification of the target vehicle is acquired can include: when vehicle identifications obtained at two adjacent times are identical, determining at least one piece of the location information obtained by positioning during the two adjacent times of obtaining the vehicle identification as the location information when the vehicle identification is acquired.

In some embodiments, the acquiring unit 301 acquiring the vehicle identification of the target vehicle can include: if the carrier is an in-vehicle fee-charging terminal, when a boarding request is sent to the in-vehicle fee-charging terminal, obtaining the vehicle identification of the target vehicle from the in-vehicle fee-charging terminal.

In some embodiments, the acquiring unit 301 obtaining the vehicle identification of the target vehicle from the in-vehicle fee-charging terminal can include: obtaining the vehicle identification of the target vehicle from the in-vehicle fee-charging terminal in an NFC mode.

In some embodiments, the determining unit 302 determining location information when the vehicle identification of the target vehicle is acquired can include: after the boarding request is sent to the in-vehicle fee-charging terminal, determining the location information periodically or in real time; and determining at least one piece of location information as the location information when the vehicle identification of the target vehicle is acquired.

In some embodiments, the acquiring unit 301 obtaining the vehicle identification of the target vehicle from the carrier can include: if the carrier is a WIFI device provided by the target vehicle, obtaining the vehicle identification of the target vehicle from the WIFI device when the WIFI device is accessed.

In some embodiments, the acquiring unit 301 obtaining the vehicle identification of the target vehicle from the WIFI device can include: taking a WIFI identification of the WIFI device as the vehicle identification of the target vehicle.

In some embodiments, the device 300 for location positioning can further include a storage unit 304. After the location information is determined when the vehicle identification of the target vehicle is acquired, the storage unit 304 stores the vehicle identification and the location information corresponding to the vehicle identification. In some embodiments, the sending unit 303 sending the vehicle identification and the location information to the server can include: sending the vehicle identification and at least one piece of the location information corresponding to the vehicle identification to the server when the set sending time arrives.

It should be appreciated that the device 300 for location positioning may be implemented by software, or by hardware, or by a combination of software and hardware, which is not limited herein. The device 300 can acquire the vehicle identification of the target vehicle, determine the location information when the vehicle identification is acquired, and then send the vehicle identification and the location information to the server, so that the server determines the location of the target vehicle based on the location information.

Compared with the existing techniques for determining the location of the vehicle through GPS, the device 300 can determine the location of the vehicle, and avoid the problem caused by weak GPS signal strength due to environmental factors, which affects GPS-based positioning. Even in big cities with high-rise buildings and overpasses, by determining the location information when the vehicle identification is acquired, the success rate and effectiveness of the location information acquisition can be improved. The continuity and accuracy of the location positioning of the target vehicle can therefore be ensured.

Figure 4:
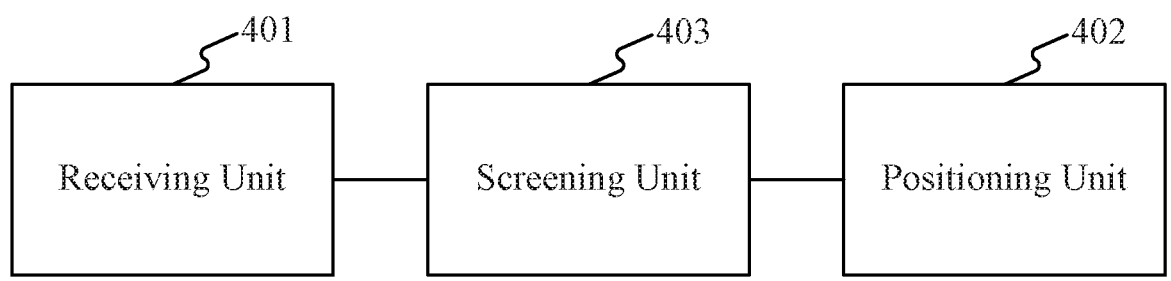
FIG. 4 is a block diagram of a device for location positioning according to an embodiment.

FIG. 4 is a block diagram of a device 400 for location positioning according to an embodiment. For example, the device 400 may be a server. The device 400 for location positioning can include: a receiving unit 401 and a positioning unit 402.

The receiving unit 401 can receive a vehicle identification and location information sent by at least one client terminal.

The positioning unit 402 can determine a location of the vehicle corresponding to the vehicle identification according to the location information.

In some embodiments, the positioning unit 402 determining a location of the vehicle corresponding to the vehicle identification according to the location information can include: determining, for the target vehicle, location information corresponding to the vehicle identification of the target vehicle sent by different client terminals and received within a set time period; processing the received location information; and determining a location of the target vehicle corresponding to the vehicle identification according to the processing result.

In some embodiments, the positioning unit 402 processing the received location information can include: determining an offset weight of each piece of location information received, the offset weight being used to represent an extent to which the location information deviates from the actual location of the target vehicle; and calculating a processing result based on the offset weight of each piece of location information and a coordinate contained in each piece of location information.

In some embodiments, the device 400 for location positioning further includes a screening unit 403. Before determining the location of the target vehicle corresponding to the vehicle identification according to the location information, if a number of pieces of location information corresponding to the vehicle identification of the target vehicle which is sent by each client terminal and received within the set time period is larger than 1, the screening unit 403 can perform the following operations on the location information corresponding to the vehicle identification of the target vehicle sent by each client terminal: determining a generation time of each piece of location information corresponding to the vehicle identification of the target vehicle sent by the client terminal; according to the generation time, selecting, from the pieces of location information, location information satisfying a set condition; and determining the selected location information as the location information corresponding to the vehicle identification of the target vehicle sent by the client terminal within the set time period.

In some embodiments, the positioning unit 402 determining the location of the vehicle corresponding to the vehicle identification according to the location information can include: determining, for the target vehicle, location information corresponding to the vehicle identification of the target vehicle sent by different client terminals and received within a set time period; counting a number of occurrences of each piece of the location information; and determining the location of the vehicle corresponding to the vehicle identification according to the location information of which the number of occurrences is larger than a set threshold.

In some embodiments, the positioning unit 402 determining the location of the vehicle corresponding to the vehicle identification according to the location information can include: determining, for the target vehicle, a generation time of each piece of location information corresponding to the received vehicle identification; processing location information with the same generation time to obtain a location of the target vehicle at a time corresponding to the generation time; and when a location of the target vehicle corresponding to each generation time is obtained, determining a moving track of the target vehicle based on each of the locations.

It should be appreciated that the device 400 for location positioning may be implemented by software, or by hardware, or by a combination of software and hardware, which is not limited herein. The device 400 for location positioning can determine the location information by different client terminals when the vehicle identification is acquired. That way, the success rate and effectiveness of the location information acquisition can be improved. The continuity and accuracy of the location positioning of the target vehicle can be ensured.

In some embodiments, an electronic device for location positioning is provided. The electronic device includes at least one processor and a memory. The memory stores a program that can be executed by the at least one processor to perform the following operations: acquiring a vehicle identification of a target vehicle; determining location information when the vehicle identification of the target vehicle is acquired; and sending the vehicle identification and the location information to a server, such that the server determines a location of the target vehicle according to the location information. It is appreciated that that the electronic device can perform functions described above with respect to the client terminal embodiments, which are not repeated herein.

In some embodiments, a computer-readable storage medium is provided. The computer-readable storage medium includes a program for use in conjunction with an electronic device. The program is executable by a processor of the electronic device to cause the electronic device to perform the following operations: acquiring a vehicle identification of a target vehicle; determining location information when the vehicle identification of the target vehicle is acquired; and sending the vehicle identification and the location information to a server, such that the server determines a location of the target vehicle according to the location information. It should be appreciated that the computer-readable storage medium can store instructions to cause a processor to perform functions described above with respect to the client terminal embodiments, which are not repeated herein.

Figure 5:
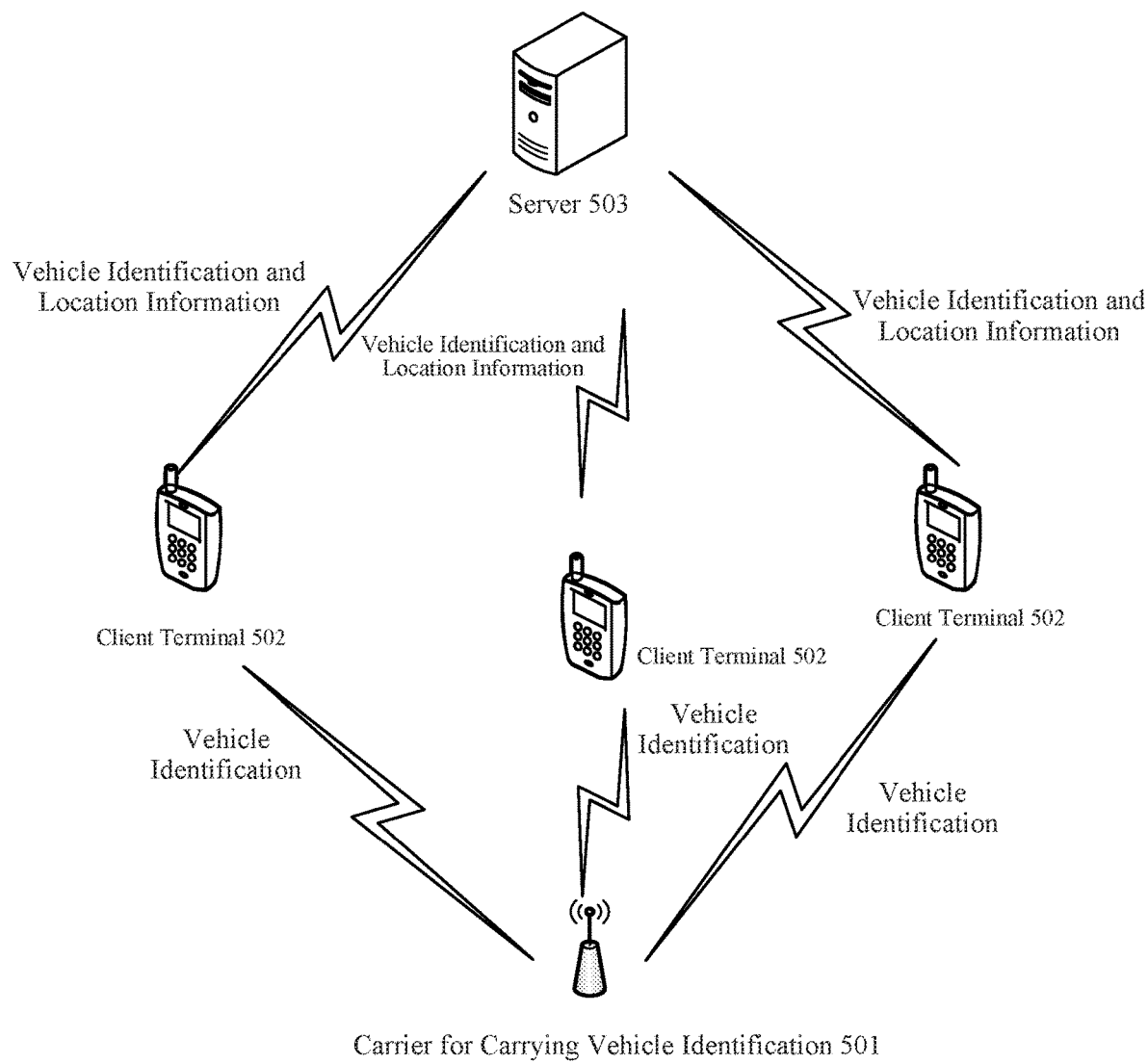
FIG. 5 is a schematic diagram of a system for location positioning according to an embodiment.

FIG. 5 is a schematic diagram of a system 500 for location positioning according to an embodiment. The system 500 includes a carrier 501, one or more client terminals 502, and a server 503.

The carrier 501 can be located on the vehicle and can store a vehicle identification of the vehicle.

The client terminal 502 can acquire a vehicle identification of the vehicle from the carrier, determine location information when the vehicle identification of the vehicle is acquired, and send the vehicle identification of the vehicle and the location information corresponding to the vehicle identification to the server 503.

The server 503 receives the vehicle identification and the location information corresponding to the vehicle identification sent by the client terminal 502, and determines the location of the vehicle according to the location information.

Each of the above described methods and units may be implemented as software, or hardware, or a combination of software and hardware. For example, a Programmable Logic Device (PLD) (such as a Field Programmable Gate Array (FPGA)) is an integrated circuit, the logic functions of which can be programmed by a user. Designers can integrate a digital system on a single PLD through programming, without requiring a chip manufacturer to design and fabricate a dedicated integrated circuit chip. Moreover, instead of manually making integrated circuit chips, programming can be implemented using logic compiler software, which is similar to a software compiler used in programming development. The original codes before compiling can be written in a programming language, which can be referred to as Hardware Description Language (HDL). There may be different types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. For example, commonly used HDLs include VHDL (Very-High-Speed Integrated Circuit Hardware Description Language) and Verilog. It is appreciated that method procedures described above can be programmed into an integrated circuit through logic programming using the above HDLs. A hardware circuit that implements the logic method procedures can be obtained.

Figure 6:
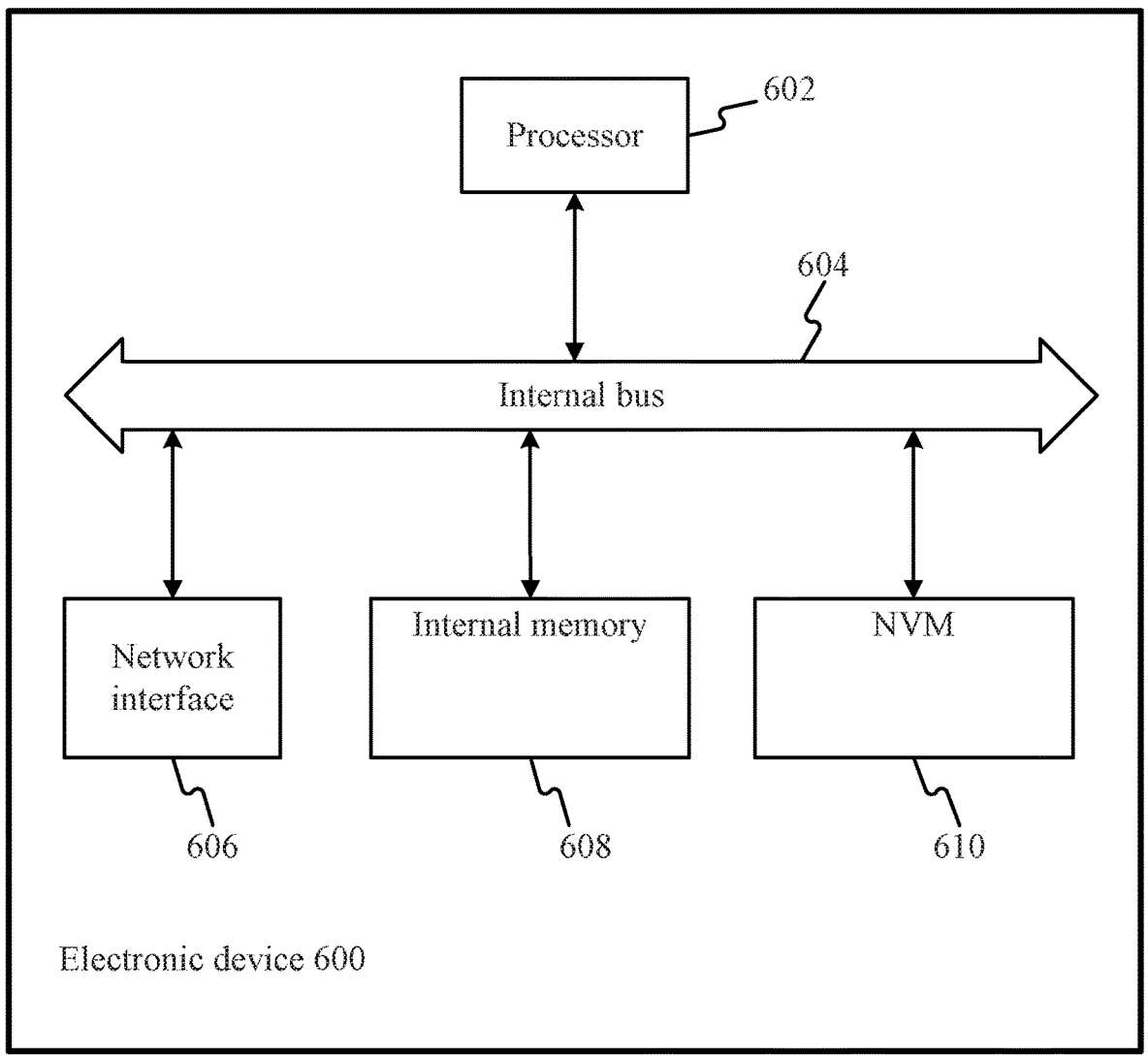
FIG. 6 is a schematic diagram of a device for location positioning according to an embodiment.

FIG. 6 is a schematic diagram of a device 600 according to an embodiment. For example, the device 600 may be any of the client terminal or server described above. Referring to FIG. 6, the device 600 includes a processor 602, an internal bus 604, a network interface 606, and a memory such as an internal memory 608 and a nonvolatile memory 610. The processor 602 is configured to execute instructions stored in the memory for performing the above described methods.

A controller can be implemented in any suitable manner in the above described devices. For example, the controller can be in a form of, for example, a microprocessor or processor and a computer-readable medium, for storing computer-readable program codes (e.g., software or firmware) executable by the (micro)processor, a logic gate, a switch, an Application Specific Integrated Circuit (ASIC), a programmable logic controller, and an embedded microcontroller. Examples of the controller include, but are not limited to, the following micro-controls: ARC 625D, Atmel AT91SAM, Microchip PIC18F26K20 and Silicone Labs C8051F320. A memory controller can also be implemented as a part of the control logic of the memory. Those skilled in the art will also appreciate that in addition to implementing the controller in purely computer-readable program codes, the controller can implement the same functions in a form of a logic gate, a switch, an ASIC, a programmable logic controller, and an embedded microcontroller by logically programming the method steps. Thus, such a controller can be considered as a hardware component, and the means for implementing various functions included therein can also be considered as a structure within the hardware component. Alternatively, the means for implementing various functions can be considered as a software module that implements a method or a structure within a hardware component.

The system, device, module or unit set forth in the above embodiments may be implemented by a computer chip or an entity, or by a product having a certain function. For example, the implementation device can be a computer. The computer can be in the form of, for example, a personal computer, a laptop computer, a cellular phone, a camera phone, a smart phone, a personal digital assistant, a media player, a navigation device, an email device, a game console, a tablet, a wearable device, or a combination of any of these devices.

For the convenience of description, the above devices are described in various units divided by functions. The units may be divided in a different manner. The functions of the various units may also be implemented in one or more pieces of software and/or hardware in the implementation of embodiments of the specification.

Those skilled in the art will appreciate that some embodiments can be provided as a method, a system, or a computer program product. For example, some embodiments provided herein can take the form of an entirely hardware embodiment, an entirely software embodiment, or an embodiment combining software and hardware. Moreover, some embodiments can take a form of a computer program product embodied by one or more computer-readable storage media (including but not limited to a disk storage, a CD-ROM, an optical storage, etc.) in which computer usable program codes are included.

Some embodiments are described with reference to flowcharts and/or block diagrams of the methods, devices (systems) and computer products. It will be understood that each step and/or block of the flowcharts and/or block diagrams, and combinations of the procedures and/or blocks in the flowcharts and/or block diagrams may be implemented in the form of computer program instructions. Such computer program instructions can be provided to a processor of a general purpose computer, a special purpose computer, an embedded processor, or other programmable data processing device to produce a machine. The functions associated with one or more procedures described with reference to the flowcharts and/or one or more blocks in the block diagrams can be implemented by a processor of the computer or other programmable data processing device executing the instructions.

The computer program instructions can also be stored in a computer-readable memory which can guide a computer or other programmable data processing device to operate in a particular manner, causing instructions stored in the computer-readable memory to produce an article of manufacture of an instruction device. The instruction device can implement functions associated with one or more procedures described above with reference to the flowcharts and/or one or more blocks in the block diagrams.

These computer program instructions can also be loaded onto a computer or other programmable data processing devices so that a series of operational procedures can be performed on the computer or other programmable data processing devices. For example, the instructions executed on the computer or other programmable data processing device provide procedures implementing functions designated in one or more procedures in the flowcharts and/or one or more blocks in the block diagrams.

The computer-readable storage medium can include permanent and non-permanent as well as removable and non-removable media, and may implement information storage using various methods. The information may be computer-readable instructions, data structures, modules of a program, or other data. Examples of the computer-readable storage medium can include, but are not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technologies, a CD-ROM, a digital versatile disc (DVD) or other optical storage, a magnetic cassette, a magnetic tape or disc storage or other magnetic storage device, or any other non-transportable medium that can be used to store information accessible by a computing device. The computer-readable storage medium may not include transitory computer-readable media (transitory media), such as modulated data signals and carrier waves.

It is appreciated that the terms "include" or "comprise" or any other variations used herein may encompass a non-exclusive inclusion. A process, a method, an article, or a device that includes a series of elements can include not only those listed elements but also other elements that are not explicitly listed, or elements that are inherent to such a process, a method, an article, or a device. An element defined by the phrase "including a . . . ," without further limitation, does not exclude the presence of additional identical elements in the process, the method, the article, or the device including the element.

The above described methods can be implemented by instructions executed by a computer, such as program modules. Generally, the program modules can include routines, programs, objects, components, data structures, and the like that can be used to perform particular tasks or implement particular data types. The above described methods can also be practiced in distributed computing environments where tasks are performed by remote processing devices that are connected through a communication network. In a distributed computing environment, program modules can be located in both local and remote computer storage media.

Various embodiments of the specification are described above. Reference can be made to identical or similar parts described with respect to different embodiments. Further, description of one embodiment may focus on differences from some other embodiments. For example, for the system embodiments, as the procedures performed therein may be similar to the method embodiments, reference can be made to the detailed description provided with respect to the method embodiments.

The above description provides only exemplary embodiments of the specification and is not intended to limit the specification. Various changes and modifications can be made to the embodiments by those skilled in the art, consistent with the specification. Any modifications, equivalent substitutions, improvements, etc. made within the spirit and scope of the specification shall all fall within the scope defined in the appended claims.

The invention claimed is:

1. A method for location positioning, comprising:
   receiving a vehicle identification and location information from at least one client terminal; and
   determining a location of a target vehicle corresponding to the vehicle identification according to the location information,
   wherein the determining the location of the target vehicle corresponding to the vehicle identification according to the location information comprises:
      determining a plurality of pieces of location information corresponding to the vehicle identification received from the at least one client terminal within a set time period;
      determining a number of occurrences of each piece of different location information in the plurality of pieces of location information; and
      determining the location of the target vehicle corresponding to the vehicle identification according to a piece of the plurality of pieces of location information with the determined number of occurrences larger than a set threshold; and
   wherein the determining the location of the target vehicle corresponding to the vehicle identification according to the location information further comprises:
      determining a plurality of offset weights for the plurality of pieces of location information, respectively, each of the plurality of offset weights indicating a deviation from an actual location of the target vehicle; and
      determining the location of the target vehicle corresponding to the vehicle identification based on the plurality of offset weights for the plurality of pieces of location information and a plurality of coordinates contained in the plurality of pieces of location information.

2. The method according to claim 1, wherein the plurality of pieces of location information are a first plurality of pieces of location information, and before determining the location of the target vehicle corresponding to the vehicle identification according to the location information, the method further comprises:
   determining a plurality of generation times for a second plurality of pieces of location information corresponding to the vehicle identification received from a first client terminal of the at least one client terminal;
   selecting a piece of the second plurality of pieces of location information based on the generation times; and
   determining the selected piece of location information as the location information corresponding to the vehicle identification received from the first client terminal.

3. The method according to claim 1, further comprising:
   determining a plurality of generation times corresponding to the plurality of pieces of location information; and
   determining a moving track of the target vehicle based on the plurality of pieces of location information and the corresponding generation times.

4. The method of claim 1, further comprising:
   acquiring the vehicle identification of the target vehicle; and
   determining the piece of the plurality of pieces of location information when the vehicle identification of the target vehicle is acquired.

5. The method according to claim 4, wherein the acquiring the vehicle identification of the target vehicle comprises:
   detecting a carrier carrying the vehicle identification of the target vehicle; and
   obtaining the vehicle identification of the target vehicle from the carrier.

6. The method according to claim 4, wherein the acquiring the vehicle identification of the target vehicle comprises:
   detecting a radio frequency identification (RFID) tag associated with the target vehicle; and
   obtaining the vehicle identification of the target vehicle from the RFID tag.

7. The method according to claim 6, wherein,
   the vehicle identification is obtained from the RFID tag in a periodic manner; and
   the determining the piece of the plurality of pieces of location information when the vehicle identification of the target vehicle is acquired comprises:
      in response to vehicle identifications obtained at two adjacent times are identical, determining at least one piece of location information obtained during the two adjacent times as the piece of the plurality of pieces of location information when the vehicle identification is acquired.

8. The method according to claim 4, wherein the acquiring the vehicle identification of the target vehicle comprises:
   obtaining the vehicle identification of the target vehicle from an in-vehicle fee-charging terminal, when a boarding request is sent to the in-vehicle fee-charging terminal.

9. The method according to claim 8, wherein the obtaining the vehicle identification of the target vehicle from the in-vehicle fee-charging terminal comprises:
   obtaining the vehicle identification of the target vehicle from the in-vehicle fee-charging terminal in a near field communication (NFC) mode.

10. The method according to claim 8, wherein the determining the piece of the plurality of pieces of location information when the vehicle identification of the target vehicle is acquired comprises:

after the boarding request is sent to the in-vehicle fee-charging terminal, determining multiple pieces of location information periodically or in real time; and determining at least one piece of the multiple pieces of location information as the piece of the plurality of pieces of location information when the vehicle identification of the target vehicle is acquired.

11. The method according to claim 4, wherein the acquiring the vehicle identification of the target vehicle comprises:

accessing a Wireless Fidelity (WIFI) device provided on the target vehicle; and obtaining the vehicle identification of the target vehicle from the WIFI device.

12. The method according to claim 11, wherein the obtaining the vehicle identification of the target vehicle from the WIFI device comprises:

taking a WIFI identification of the WIFI device as the vehicle identification of the target vehicle.

13. The method according to claim 4, wherein the vehicle identification and the location information corresponding to the vehicle identification are sent to a server at a preset time.

14. A device for location positioning, comprising:

a processor; and a memory storing instructions;

wherein the processor is configured to execute the instructions to:

receive a vehicle identification and location information from at least one client terminal; and determine a location of a target vehicle corresponding to the vehicle identification according to the location information, wherein in determining the location of the target vehicle corresponding to the vehicle identification according to the location information, the processor is further configured to execute the instructions to:

determine a plurality of pieces of location information corresponding to the vehicle identification received from the at least one client terminal within a set time period;

determine a number of occurrences of each piece of different location information in the plurality of pieces of location information; and determine the location of the target vehicle corresponding to the vehicle identification according to a piece of the plurality of pieces of location information with the determined number of occurrences larger than a set threshold; and wherein in determining the location of the target vehicle corresponding to the vehicle identification according to the location information, the processor is further configured to execute the instructions to:

determine a plurality of offset weights for the plurality of pieces of location information, respectively, each of the plurality of offset weights indicating a deviation from an actual location of the target vehicle; and determine the location of the target vehicle corresponding to the vehicle identification based on the plurality of offset weights for the plurality of pieces of location information and a plurality of coordinates contained in the plurality of pieces of location information.

15. The device according to claim 14, wherein the plurality of pieces of location information are a first plurality of pieces of location information, and before determining the location of the target vehicle corresponding to the vehicle identification according to the location information, the processor is further configured to execute the instructions to:

determine a plurality of generation times for a second plurality of pieces of location information corresponding to the vehicle identification received from a first client terminal of the at least one client terminal;

select a piece of the second plurality of pieces of location information based on the generation times; and determine the selected piece of location information as the location information corresponding to the vehicle identification received from the first client terminal.

16. The device according to claim 14, wherein the processor is further configured to execute the instructions to:

determine a plurality of generation times corresponding to the plurality of pieces of location information; and determine a moving track of the target vehicle based on the plurality of pieces of location information and the corresponding generation times.

17. A non-transitory computer readable medium storing instructions that, when executed by a processor of a device, cause the device to perform a method for location positioning, the method comprising:

receiving a vehicle identification and location information from at least one client terminal; and determining a location of a target vehicle corresponding to the vehicle identification according to the location information, wherein the determining the location of the target vehicle corresponding to the vehicle identification according to the location information comprises:

determining a plurality of pieces of location information corresponding to the vehicle identification received from the at least one client terminal within a set time period;

determining a number of occurrences of each piece of different location information in the plurality of pieces of location information; and determining the location of the target vehicle corresponding to the vehicle identification according to a piece of the plurality of pieces of location information with the determined number of occurrences larger than a set threshold; and wherein the determining the location of the target vehicle corresponding to the vehicle identification according to the location information further comprises:

determining a plurality of offset weights for the plurality of pieces of location information, respectively, each of the plurality of offset weights indicating a deviation from an actual location of the target vehicle; and determining the location of the target vehicle corresponding to the vehicle identification based on the plurality of offset weights for the plurality of pieces of location information and a plurality of coordinates contained in the plurality of pieces of location information.

* * * * *